June 4, 1940.    F. C. BEST    2,203,292
GEARING
Filed Oct. 29, 1937
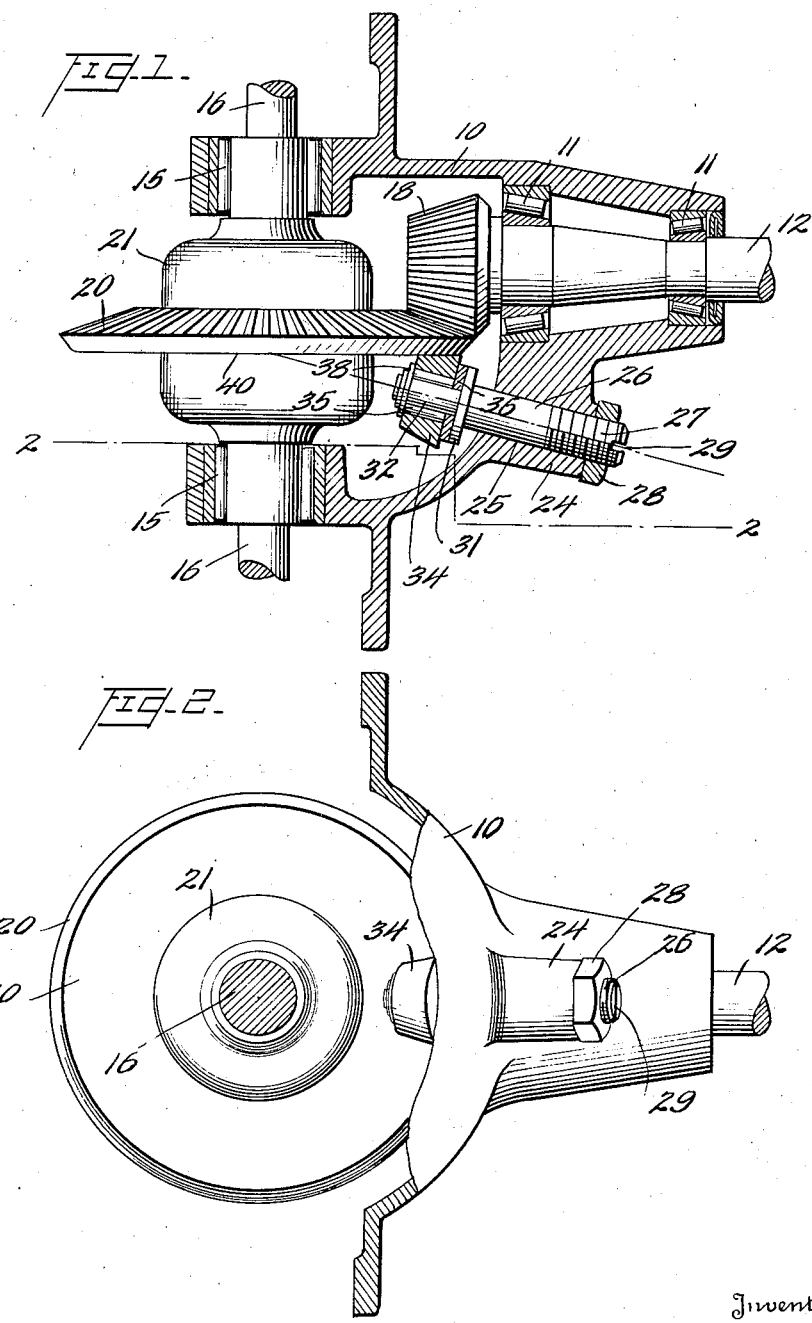
Inventor
Frank C. Best
By Watson, Coit, Morse & Grindle
Attorneys Patented June 4, 1940

2,203,292

UNITED STATES PATENT OFFICE 2,203,292

GEARING

Frank C. Best, Detroit, Mich., assignor to Packard Motor Car Company, Detroit, Mich., a corporation of Michigan Application October 29, 1937, Serial No. 171,792

1 Claim. (Cl. 74—311)

This invention relates to improvements in gearing and is particularly concerned with differential gearing for motor vehicles. It is the principal object of the invention to improve the smoothness of meshing of the gears, and to eliminate excessive stressing and wear of the gear teeth and the supporting bearings for the cooperating gears, whereby the use of lighter bearings and supporting structures therefor may be permitted.

More specifically, it is an object of the invention to provide, in combination with the bevel ring gear and driving pinion of a differential train, of a roller for engagement with the ring gear to resist the thrust applied thereto by the action of the teeth on the driving pinions, this roller being so supported as to engage and roll on the ring gear without slippage or friction and to receive the thrust in a direction normal to the surface of the roller.

A further object of the invention is to provide a device of this character which is capable of adjustment to accurately determine the proper meshing relation between the ring gear and the driving pinion, whereby compensation for wear of the intermeshing teeth can be readily effected.

Further objects and features of the invention will be apparent from the following description taken in connection with the following drawing in which, Figure 1 is a horizontal section through a portion of a differential housing illustrating the application of the invention to the gearing supported within the housing; and Figure 2 is a vertical sectional view taken substantially on the line 2—2 of Figure 1.

In describing the invention, reference is made herein to the embodiment thereof shown in the drawing for the purpose of illustration and specific language is employed. It will nevertheless be understood that no limitation of the invention is thereby intended, various alterations and modifications of the illustrated structure such as would occur to one skilled in the art being contemplated.

Referring to the drawing, it will be observed that the portion of the differential housing illustrated therein is indicated at 10, this housing being formed to completely enclose the differential gearing and to provide a support for bearings 11 in which the drive or propeller shaft 12 is rotatably mounted. The housing is also formed to provide a support for bearings 15 in which are journalled the laterally extending driving axles 16. The drive shaft 12 carries at its end and within the housing 10 a driving bevel pinion 18 which meshes with a ring gear 20, it being understood that the latter is operatively connected with further gearing within the casing 21 so as to transmit torque to the driving axles 16 in the conventional manner, the details of the gearing within the casing 21 forming no part of the instant invention.

The differential housing 10 is formed with a protruding boss 24 which is drilled to provide an opening 25 therethrough in which is received a spindle 26. The outer portion of the opening 25 is threaded for cooperation with the threaded portion 27 of the spindle 26, so that the spindle may be adjusted axially of the opening 25 by rotation thereof and may be locked in any position to which it is adjusted by means of a lock nut 28. A slot 29 may be provided on the outer end of the spindle 26 for the reception of a screw driver or other tool whereby the adjustment in question can be readily effected from the exterior of the differential housing 10.

The spindle 26 is provided with a shoulder 31 and a reduced portion 32, a conical roller 34 being journalled on this reduced portion by means of pin bearings 35. A washer 36 may be interposed between the roller 34 and the shoulder 31 and suitable means indicated generally at 38 may be associated with the inner end of the spindle 26 to prevent the unintentional displacement of the roller 34 from the spindle. The conical surface of the roller 34 bears against the flat rear surface 40 of the ring gear 20, the surface 40 as shown defining a plane normal to the axis of the ring gear. The axis of the spindle 26 and roller 34 is illustrated as disposed in a plane containing both the axis of the ring gear and the axis of the drive shaft 12. It will be noted that the axis of the spindle 26 and roller 34 intersects the axis of the ring gear in the plane of the surface 40 and consequently in the line of contact between the roller 34 and this surface. In other words, the disposition of the roller is such that the ratio between the smaller and larger diameters of the roller is equal to the ratio of radii measured from the ring gear axis to the points of contact of the smaller and larger diameters of the roller 34 with the surface 40 of the ring gear. Consequently, there is no slippage or friction between the ring gear and the roller as the ring gear is rotated. To state the matter differently, the apex of the cone defined by the conical surface of the roller lies in the surface of revolution 40 with which the roller engages and in the axis of the ring gear. In the special case illustrated, the surface of revolution in question is of course a plane normal to the axis of the ring gear.

It will be appreciated that when torque is transmitted from the driving pinion 18 to the ring gear 20, the cooperating teeth tend to separate with resultant tendency to twist the ring gear out of its proper plane and with consequent application of considerable pressure to the bearings 15 on which the differential gearing is supported. This action not only results in excessive wear of the cooperating teeth and the several supporting bearings, but results in the development of considerable noise, principally by reason of the failure of the cooperating teeth to properly mesh. If, however, the spindle 26 is adjusted axially in the boss 24 as hereinbefore proposed so as to position the roller 34 in contact with the ring gear, sufficient pressure being thus applied to the ring gear to maintain the teeth thereof in proper meshing relationship with the teeth of the pinion 18, the thrust imposed on the ring gear by the application of a heavy load thereto will be adequately resisted and will be transmitted through the roller 34 to the differential housing 10. It will be further noted that this thrust is applied to the roller in a direction which is normal to the roller surface at the line of contact between the roller and the differential gear. Consequently there is no reaction against the ring gear tending to displace the ring gear or roller radially of the ring gear axis.

Since the adjustment of the position of the roller 34 may be readily effected from the exterior of the differential housing, improper meshing of the cooperating teeth of the pinion 18 and ring gear 20 can readily be eliminated from time to time, the teeth being forced into closer mesh by the roller 34. Thus the possibility of the stripping of these teeth may be avoided, the quietness of operation of the gear may be restored even after considerable wear has occurred, and the life of the gearing prolonged indefinitely. Since the ring gear and pinion may be maintained in true rolling contact, stresses on the bearings which support the same are materially reduced and the size and weight of the bearings can be lessened. Again, since the thrust between the ring gear and the roller has no component in a direction radial to the ring gear axis, wear on the ring gear bearings is minimized. There need be little or no provision made to resist end thrust in the differential bearings and the differential housing can be made considerably lighter.

Having thus described the invention, what is claimed as new and desired to be secured by Letters Patent is:

Toothed gearing comprising a ring gear having bevel teeth on one side thereof and a surface defining a plane normal to the gear axis on the other side thereof, a pinion having bevel teeth meshing with said ring gear teeth, a roller having a conical surface, means supporting said roller with the conical surface thereof in line contact with the plane surface on said ring gear opposite said pinion and with the apex of the cone defined by said conical surface in the axis of said ring gear and in the said plane surface, and means for adjustably moving said roller toward said ring gear.

FRANK C. BEST.